US009316825B2

(12) United States Patent
Hsu et al.

(10) Patent No.: US 9,316,825 B2
(45) Date of Patent: Apr. 19, 2016

(54) COLOR WHEEL MODULE AND PROJECTOR APPARATUS COMPRISING THE SAME

(71) Applicant: Delta Electronics, Inc., Taoyuan Hsien (TW)

(72) Inventors: Mao Shan Hsu, Taoyuan Hsien (TW); Lai Chang Lin, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 207 days.

(21) Appl. No.: 14/097,968

(22) Filed: Dec. 5, 2013

(65) Prior Publication Data

US 2015/0002818 A1    Jan. 1, 2015

(30) Foreign Application Priority Data

Jun. 26, 2013  (TW) .............................. 102122637 A

(51) Int. Cl.
| | |
|---|---|
| *G02B 5/20* | (2006.01) |
| *G02B 26/00* | (2006.01) |
| *G02B 27/22* | (2006.01) |
| *G02B 7/00* | (2006.01) |

(52) U.S. Cl.
CPC ................ *G02B 26/008* (2013.01); *G02B 5/20* (2013.01); *G02B 7/006* (2013.01); *G02B 27/22* (2013.01); *G02B 27/2207* (2013.01); *H04N 2209/043* (2013.01)

(58) Field of Classification Search
CPC ........ G02B 26/008; G02B 27/22; G02B 5/20; G02B 26/00; G02B 7/006; H04N 2209/043
See application file for complete search history.

(56) References Cited

U.S. PATENT DOCUMENTS

| 3,520,626 | A | * | 7/1970 | Hach ........................... 356/243.5 |
|---|---|---|---|---|
| 5,416,681 | A | * | 5/1995 | Wu ................................ 362/284 |
| 6,813,087 | B2 | * | 11/2004 | Davis ............................ 359/634 |
| 2005/0237487 | A1 | | 10/2005 | Chang |
| 2007/0139519 | A1 | * | 6/2007 | DeCusatis et al. .............. 348/58 |
| 2007/0273841 | A1 | | 11/2007 | Yu et al. |
| 2008/0151402 | A1 | * | 6/2008 | Hsu ................................ 359/892 |
| 2008/0297933 | A1 | * | 12/2008 | Hsu et al. ....................... 359/892 |

FOREIGN PATENT DOCUMENTS

| CN | 1603887 A | 4/2005 |
|---|---|---|
| EP | 1098536 A2 | 5/2001 |
| JP | 2011-28228 A | 2/2011 |
| TW | I339311 | 3/2011 |

* cited by examiner

*Primary Examiner* — Sultan Chowdhury
*Assistant Examiner* — Magda Cruz
(74) *Attorney, Agent, or Firm* — Muncy, Geissler, Olds & Lowe, P.C.

(57) ABSTRACT

A color wheel module and a projector apparatus using the same are disclosed. The color wheel module has a driving device, a polarity of color filters and a switching device. The color filters are disposed on and driven by a rotary axle of the driving device. The switching device is disposed on the side of the driving device. The driving device is capable of rotating the rotary axle and driving the color filters of the color wheel module. While the projector apparatus is in a planar image mode, a lock rod of the switching device will lock the rotary axle of the driving device to stop the operation of the driving device. While the projector apparatus is in a stereoscopic mode, the lock rod will release the axle so that the driving device is turned to drive the color filters.

15 Claims, 8 Drawing Sheets

COLOR WHEEL MODULE AND PROJECTOR APPARATUS COMPRISING THE SAME

This application claims priority to Taiwan Patent Application No. 102122637 filed on Jun. 26, 2013, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a projector apparatus comprising a color wheel module, and more particularly, to a projector apparatus capable of switching between displaying a stereoscopic image and a planar image.

2. Descriptions of the Related Art

With the development of image processing technologies, image presenting technologies have evolved from conventional planar projections to stereoscopic projections. As compared to planar projection technologies, stereoscopic projection technologies work under the following principals: images of different view angles are provided to the left and right eyes of the user, so that a stereoscopic image can be perceived by the user. Conventional ways of splitting an image into a left-eye image and a right-eye image generally require the use of a pair of special eyeglasses. Depending on the kind of eyeglasses, stereoscopic projection technologies are roughly classified into the following three types: time multiplexing technologies, polarization technologies and wavelength splitting technologies. Respective advantages and disadvantages of these three kinds of technologies will be briefly described.

In time multiplexing technologies, a common screen, a short-focus projection lens and a pair of active shutter eyeglasses may be used. In polarization technologies, a silver screen, a long-focus projection lens and a pair of passive polarization eyeglasses may be used. The manufacturing cost of the shutter eyeglasses of the former and the silver screen of the latter are very costly, making the cost of these two kinds of stereoscopic projection technologies very high and difficult to provide a cheap and competitive stereoscopic projection apparatus. For wavelength splitting technologies, although a common screen and a pair of passive eyeglasses can be used, use of two projection devices is still necessary to form a stereoscopic image by superimposing two images. Therefore, although the wavelength splitting technology is cost effective in design, it cannot satisfy the requirement for lightweight, low-profile and miniaturized projector apparatuses. However, as solid-state light sources have become increasingly developed over recent years, the aforesaid bottleneck is overcome. In other words, stereoscopic projection technologies that adopted the wavelength splitting technologies have become cost effective and simple practice in the market.

In addition to the needs for cost effective and simple stereoscopic projector apparatuses, more and more consumers now hope that a projector apparatus can switch between displaying a stereoscopic and planar image to meet different needs. Generally, it is known that this can only be accomplished by using a pair of shutter eyeglasses in combination with a display device. However, shutter eyeglasses are relatively costly and degrade the overall luminance with stereoscopic delays. As a result, an additional power source is needed, making it a product that has not been widely accepted by consumers. Accordingly, an urgent need exists in the art to provide a projection module capable of switching between the stereoscopic and planar image mode, as well as a stereoscopic projection system featuring a relatively low cost, simplified optical arrangement, miniaturized volume and improved luminance.

SUMMARY OF THE INVENTION

The present invention is a projector apparatus, which comprises a light source, a beam splitter element, an optic modulator and a color wheel module. The color wheel module further comprises a driving device, a plurality of color filters and a switching device. The plurality of color filters is disposed on the rotary axle of the driving device. The switching device is disposed on the side of the driving device. The driving device is capable of rotating the rotary axle and driving the color filters.

Under general operations, the light source of the projector apparatus is adapted to generate a light, which enters the beam splitter element disposed on a light path of the light and is then transformed into a colored light by the beam splitter element. When the projector apparatus is in a planar image mode, the lock rod of the color wheel module locks the rotary axle to stop the operation of the driving device so that the colored light directly enters the optic modulator directly and is transformed into a planar image. When the projector apparatus is in a stereoscopic image mode, the lock rod releases the rotary axle so that the driving device drives the color filters again. Then, the colored light passing through the color filters of the color wheel is transformed into a first view-angle light or a second view-angle light that are then transformed into a first view-angle image and a second view-angle image by the optic modulator.

An objective of the present invention is to switch the projector apparatus between the stereoscopic image mode and the planar image mode by use of a simple mechanical element.

Another objective of the present invention is to provide a stereoscopic projector system featuring a low cost, simply optical arrangement, a miniaturized volume and improved luminance.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. The present invention provides a projector apparatus and a color wheel module for use in the projector apparatus. It should be appreciated that in the following embodiments and attached drawings, the description of these embodiments is only for purpose of illustration rather than to limit the present invention. Meanwhile, in the following embodiments and attached drawings, elements unrelated to the present invention are omitted from depiction; and dimensional relationships among individual elements in the attached drawings are illustrated only for the ease of understanding, but not to limit the actual scale and sizes.

Figure 1:
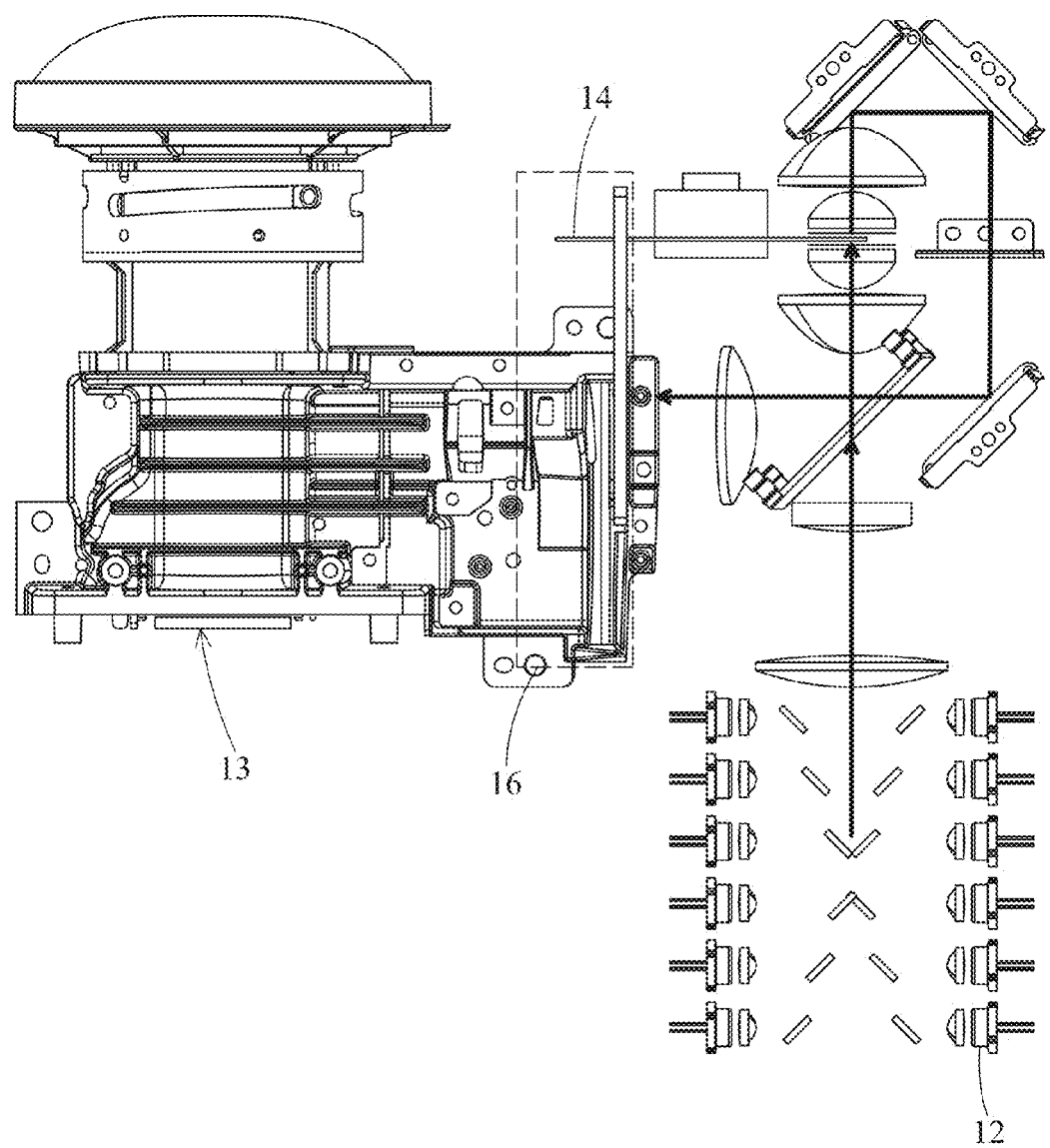
FIG. 1 is a top view of a projector apparatus according to the first embodiment of the present invention.
Figure 2:
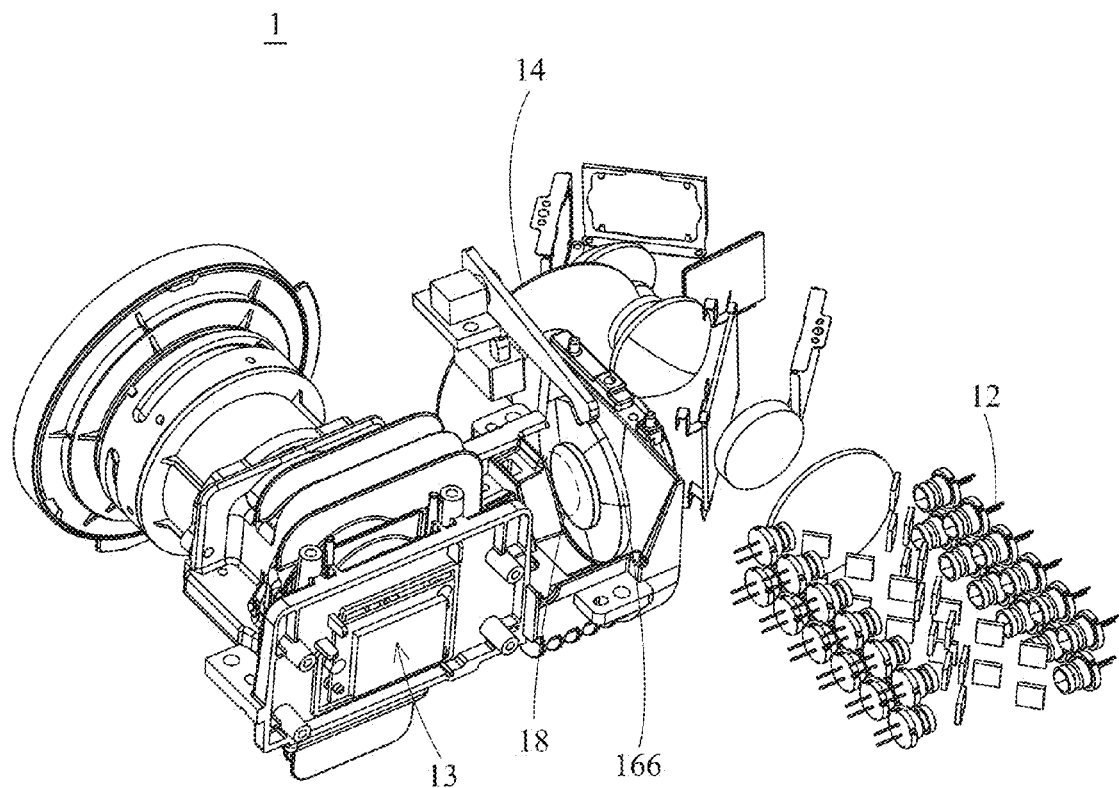
FIG. 2 is a perspective view of the projector apparatus according to the first embodiment of the present invention.

FIGS. 1 and 2 illustrate the top view and perspective view of a projector apparatus according to the first embodiment of the present invention, respectively. The present invention is a projector apparatus 1, which comprises a light source 12, a light beam splitter 14, an optic modulator 13 and a color wheel module 16. The light source 12 in this embodiment is a blue light laser adapted to generate a light (i.e., a blue laser light). The light enters the beam splitter element 14 (i.e., a fluorescent wheel in this embodiment) in a light path of the light and is then transformed by the beam splitter element 14 into a colored light. Taking this embodiment as an example, the fluorescent wheel may be divided into a red fluorescent block, a green fluorescent block and a light transmissive block. If the light passes through the red fluorescent block of the fluorescent wheel, then the blue laser light is excited into a red light; and if the light passes through the green fluorescent block, then the light is excited into a green light. Only the light path of the blue light is illustrated herein. The colored light then enters the color wheel module 16.

In detail, the projector apparatus 1 has a light receiving port 18 (see FIG. 2) for guiding the light into the color wheel module 16 and shielding undesired stray light. The light receiving port 18 is disposed in such a way so that the colored light can enter the color wheel module 16. It shall be particularly appreciated that in order to clearly illustrate the relative positions between the light receiving port 18 and the color filters 166 of the color wheel module 16, some parts of the color wheel module 16 are omitted from depiction in FIG. 1 and FIG. 2; however, this will not affect the understanding by those of ordinary skill in the art that the color wheel module 16 can be applied to the projector apparatus 1.

When the projector apparatus 1 is in a planar image mode, the colored light enters the optic modulator 13 directly and is transformed into a planar image. When the projector apparatus 1 is in a stereoscopic image mode, the colored light passes through the color filters 166 of the color wheel module 16 and is transformed into a first view-angle light or a second view-angle light. Then, the first view-angle light or the second view-angle light is transformed into a first view-angle image or a second view-angle image by the optic modulator 13. Thus, a stereoscopic image can be seen in the stereoscopic image mode by the user who simply wears a pair of passive eyeglasses.

Although the light source 12 is a laser diode (LD) in this embodiment, it may also be a light emitting diode (LED) or some other solid-state light source. The optic modulator 13 may be a digital micromirror device (DMD) or a liquid crystal display (LCD) device. The beam splitter element 14 is a fluorescent wheel in this embodiment, but it may also be a color wheel or a color splitting prism depending on the characteristics of the light source.

Figure 3:
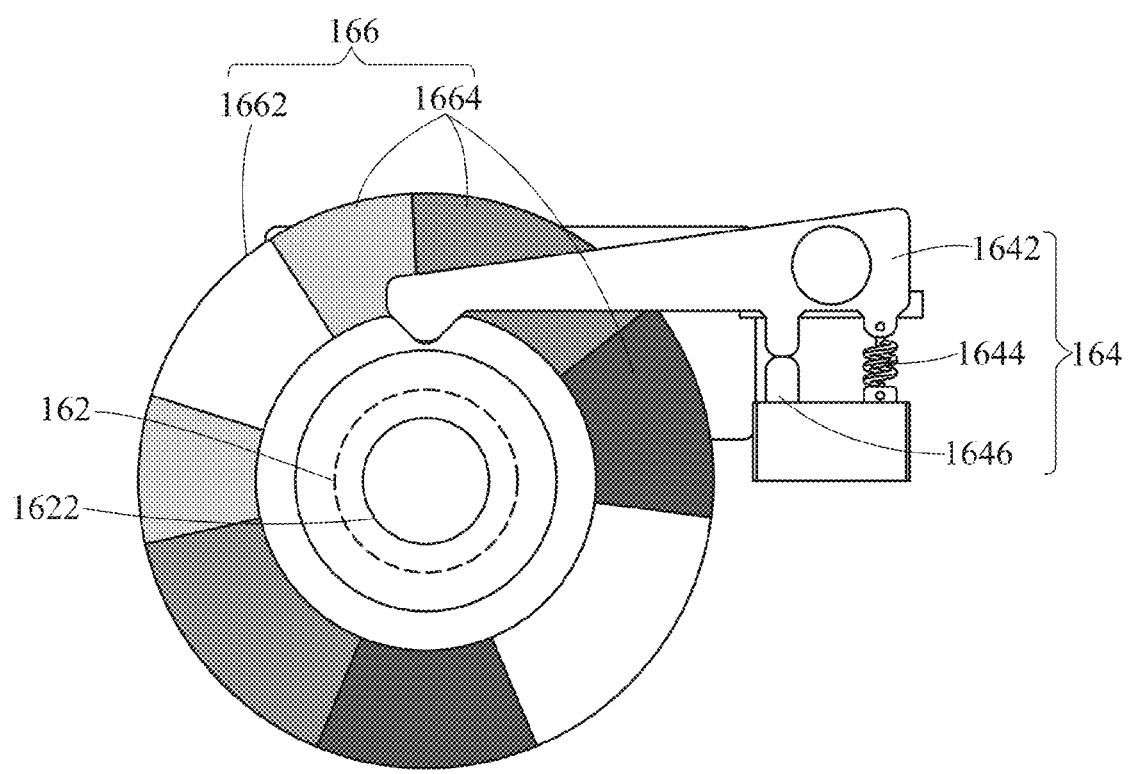
FIG. 3 is a schematic view of a color wheel module of the projector apparatus according to the first embodiment of the present invention in a planar image mode.
Figure 4:
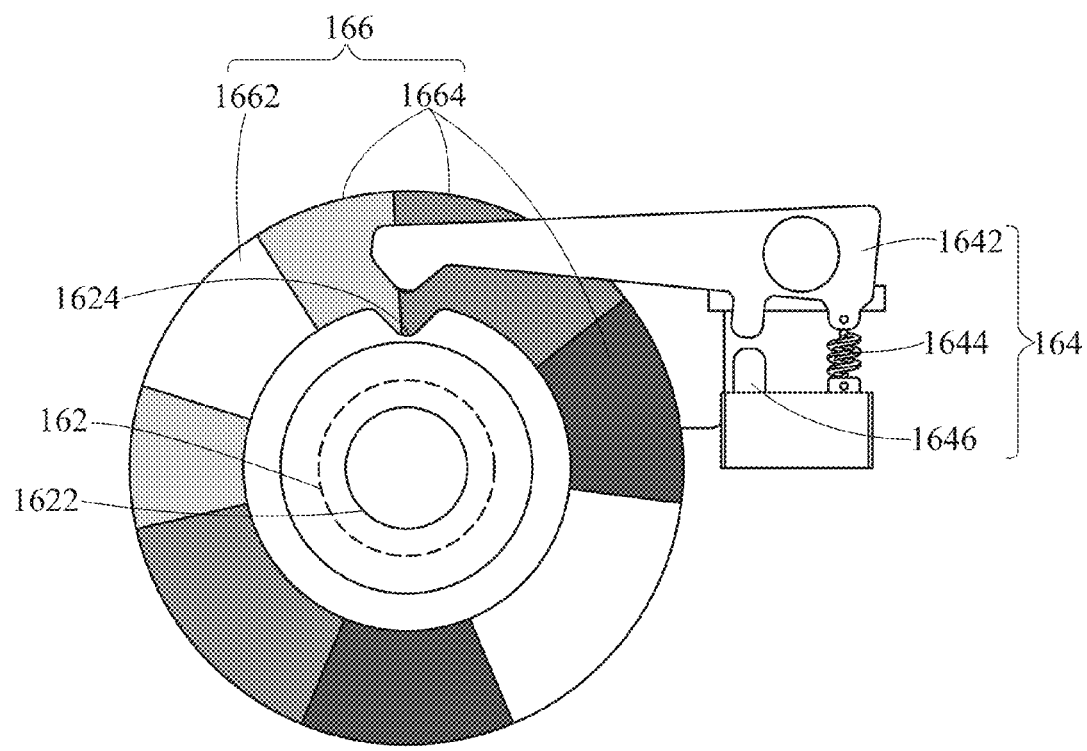
FIG. 4 is a schematic view of the color wheel module of the projector apparatus according to the first embodiment of the present invention in a stereoscopic image mode.

FIGS. 3 and 4 show schematic views of the color wheel module of the projector apparatus according to the first embodiment of the present invention in a stereoscopic and planar image mode respectively. The color wheel module 16 of the present invention comprises a driving device 162, a plurality of color filters 166 and a switching device 164. The plurality of color filters 166 is disposed upon a rotary axle 1622 of the driving device 162. The switching device 164 is disposed on the side of the driving device 162. The driving device 162 is capable of rotating the rotary axle 1622 and driving the color filters 166.

In this embodiment, the color filters 166 include two transparent filters 1662 and six colored filters 1664. The two transparent filters 1662 and the six colored filters 1664 are disposed about the rotary axle 1622 so that the light entering the color wheel module 16 passes through one of the color filters 166. In detail, six colored filters 1664 may be subdivided into two red color filters, two green color filters and two blue color filters. The two color filters of each color are used for filtering wavelengths of a specific waveband that are entering the left eye and the right eye respectively.

When the projector apparatus is in the planar image mode, the lock rod 1642 of the color wheel module 16 cooperates with a lock groove 1624 to lock the rotary axle 1622 to stop the operation of the driving device 162 so that the colored light enters the optic modulator 13 directly and is transformed into a planar image. In detail, an electromagnet 1646 in the switching device 164 is energized to attract the lock rod 1642 so that the lock rod 1642 is locked into the lock groove 1624 (see FIG. 4) for the purpose of locking the rotary axle 1622 of the driving element 162 (i.e., a motor in this embodiment). Furthermore, the lock groove 1624 is disposed at a position that allows one of the transparent filters 1622 to stay stationary right in front of the light receiving port (see FIG. 2), so that the colored light will not be transformed additionally but will pass through the transparent filter 1662 directly into the optic modulator 13. Thus, the planar image will be seen by the user.

Furthermore, if the projector apparatus is in the stereoscopic image mode (FIG. 4), then the electricity passing through the electromagnet 1646 is de-energized so that the spring 1644 of the switching device 164 is released to provide an upward thrust force for the lock rod 1642. Consequently, the lock rod 1642 separates from the rotary axle 1622 (i.e., disengages from the lock groove 1624). Then, the driving element 162 will drive the color filters 166 again so that the colored light passes through the colored filters 1664 of the color wheel module 16 at different times and is transformed into a first view-angle light or a second view-angle light. Then, the first view-angle light or the second view-angle light is transformed into a first view-angle image or a second view-angle image by the optic modulator 13.

Figure 5:
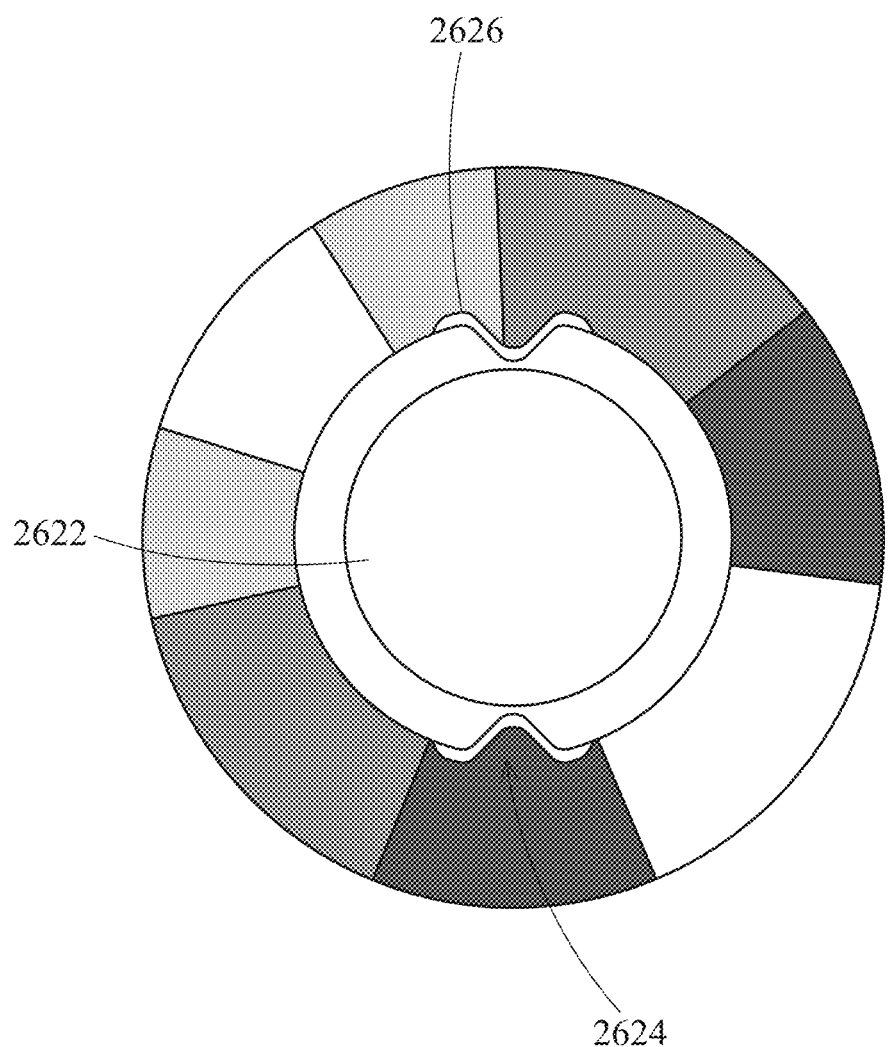
FIG. 5 is a schematic view of a color wheel module according to the second embodiment of the present invention.
Figure 6:
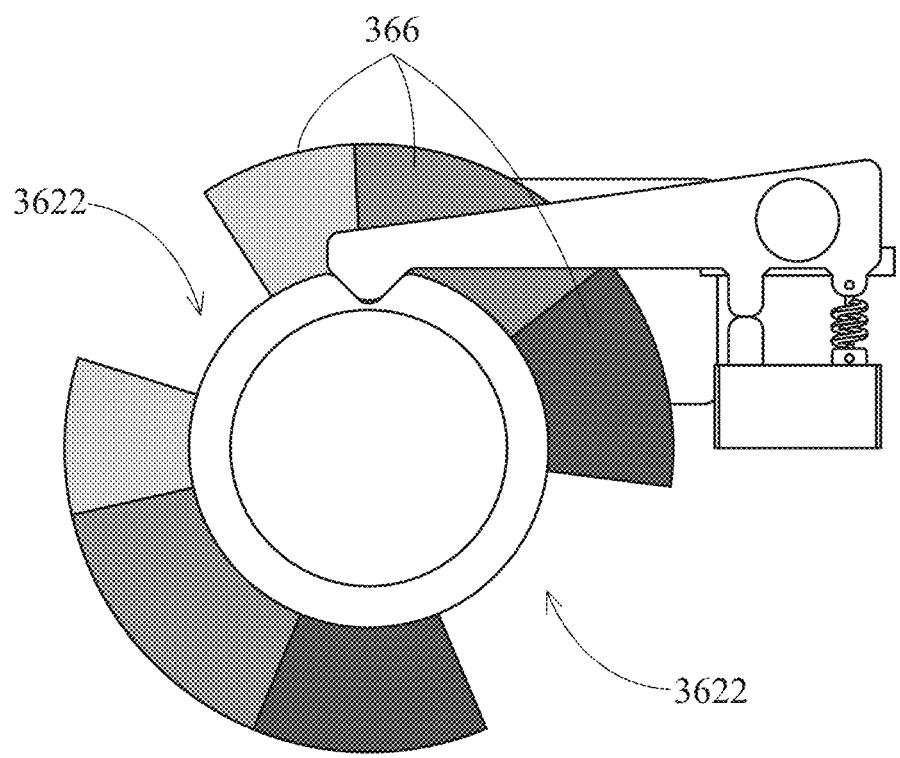
FIG. 6 is a schematic view of a color wheel module according to the third embodiment of the present invention.

FIGS. 5 and 6 are second and third embodiments of the color wheel module of the present invention are shown therein respectively. The second embodiment differs from the first embodiment in that the color wheel module 26 of the second embodiment has two lock grooves 2624 disposed symmetrically with respect to the rotary axle 2622. The two lock grooves 2624 each comprise a pad 2626 therein. The pad 2626, which may be made of silicone or some other material with a great frictional force, is used to make it easy for the lock rod (not shown) of the switching device (not shown) to lock the rotary axle 2622.

The third embodiment (FIG. 6) eliminates the use of transparent filters of the first embodiment. The driving device 162 and the rotary axle 1622 in the second and the third embodiment are identical to those of the first embodiment and, thus, will not be further depicted and described herein. In other words, the color filters 366 are disposed alternately and define two openings 3662. When the projector apparatus is in the planar image mode, the colored light passes through one of the openings 3662 to enter the optic modulator 13. Because the two openings are symmetrically disposed with respect to the rotary axle 3622, the rotation of the color wheel module 36 will not be affected.

Apart from arranging the color filters in a way as described in this embodiment, the color filters may also be spaced apart with one opening between every two color filters to define two to three openings, and this can also achieve effects similar to those of this embodiment. If the openings are designed to be disposed asymmetrically, then a plurality of small weights may be disposed at the openings to allow for stable rotation. Other arrangements and relationships among elements of the color wheel module have been described above in the first embodiment and will not be further described herein.

Figure 7:
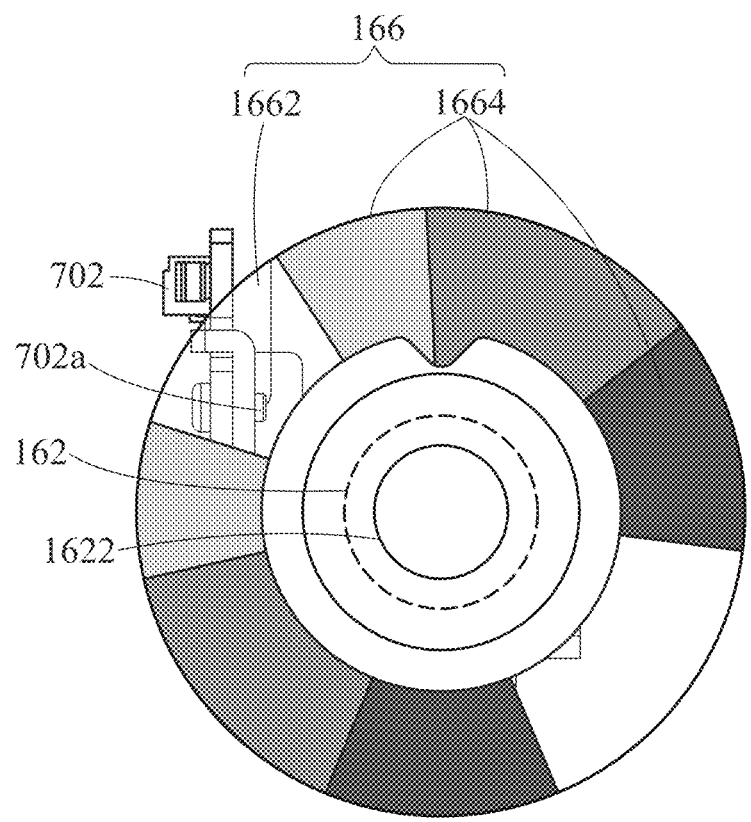
FIG. 7 is a schematic view of a color wheel module according to the fourth embodiment of the present invention.
Figure 8:
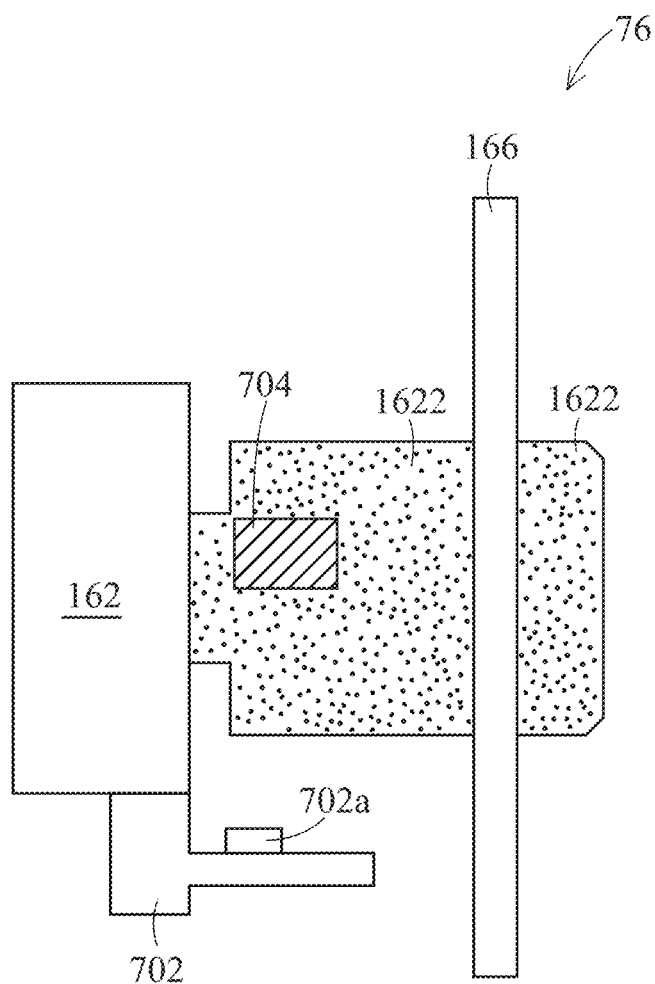
FIG. 8 is a top view of the color wheel module according to the fourth embodiment of the present invention.

Additionally, instead of switching between the planar image mode and the stereoscopic image mode in a mechanical way, a sensor device may be used in combination with control software to actuate the color wheel in the fourth embodiment of the present invention. FIGS. 7 and 8 show the schematic and top view of the color wheel module according to the fourth embodiment of the present invention, respectively.

More specifically, as shown in FIGS. 7 and 8, the color wheel module 76 of the present invention may also comprise an index board 702 disposed on the side of the rotary axle 1622 and an index strap 704 attached on the side surface of the rotary axle 1622. When the color wheel is controlled by a sensor device in combination with the control software, the index board 702 of the present invention uses an infrared module 702a. The infrared module 702a, which includes an emitting module and a receiving module, detects the location and rotating angle between the index strap 704 and rotary axle 1622 to read the color region of the color wheel. When the infrared ray emitted by the infrared module 702a is reflected by the index strap 704, the receiving module of the infrared module 702a will receive the reflected ray and calculate, by means of the software, the relationships between the signal voltage and the time to reveal the color region distribution of the color wheel.

According to the above descriptions, the color wheel module and the projector apparatus comprising the same according to the present invention allow the projector apparatus to switch between the planar image mode and the stereoscopic image mode by using the lock rod of the switching device to lock the rotary axle of the driving device. Moreover, by using a beam splitter element and a color wheel module to achieve the goal of wavelength splitting, a stereoscopic image can be seen by the user in the stereoscopic image mode by simply wearing a pair of passive eyeglasses. With the aforesaid arrangement, the goal of using a simple mechanical element to switch the projector apparatus between the stereoscopic image mode and the planar image mode can be achieved.

What is claimed is:

1. A color wheel module for a projector apparatus, comprising:
   a driving device having a rotary axle;
   a plurality of color filters disposed on the rotary axle; and
   a switching device disposed at a side of the driving device and having a lock rod,
   wherein the driving device is capable of rotating the rotary axle and driving the color filters, the lock rod locks the rotary axle so as to stop the operation of the diving device while the projector apparatus is in a planar image mode, and the lock rod releases the rotary axle so that the driving device is turned to drive the color filters while the projector apparatus is in a stereoscopic image mode, and the rotary axle further comprises at least one lock groove that cooperates with the lock rod to lock the rotary axle.

2. The color wheel module as claimed in claim 1, wherein the color filters comprise at least one colored filter and at least one transparent filter.

3. The color wheel module as claimed in claim 1, wherein the color filters are colored filters that are alternately disposed with each other and define at least one opening.

4. The color wheel module as claimed in claim 1, wherein the at least one lock groove is two lock grooves that are symmetrically disposed with respect to the rotary axle.

5. The color wheel module as claimed in claim 4, wherein the lock groove further comprises a pad therein.

6. The color wheel module as claimed in claim 1, wherein the driving device is a motor.

7. The color wheel module as claimed in claim 1, wherein the switching device further comprises an electromagnet and while the projector apparatus is in the planar image mode, the electromagnet attracts the lock rod so that the lock rod cooperates with the lock groove to locks the rotary axle.

8. The color wheel module as claimed in claim 1, further comprising an index board disposed at a side of the rotary axle and an index strap attached on a side surface of the rotary axle.

9. The color wheel module as claimed in claim 8, wherein the index board has an infrared module including an emitting module and a receiving module, and the infrared module is able to detect the location and the rotating angle of the index strap turned around the rotary axle so as to read the color region of the color wheel.

10. A projector apparatus, comprising:
    a light source, generating a light;
    a beam splitter element, disposed on an optical path of the light and transforming the light into a colored light; and
    an optic modulator, and
    a color wheel module as claimed in claim 1,
    wherein while the projector apparatus is in a stereoscopic mode, the colored light passing through the color filters is transformed into a first view-angle light or a second view-angle light that are then transformed into a first view-angle image and a second view-angle image by the optic modulator; and while the projector apparatus is in a planar image mode, the lock rod of the color wheel module locks the rotary axle so that the colored light enters the optic modulator and is transformed into a planar image.

11. The projector apparatus as claimed in claim 10, wherein the color filters of the color wheel module are alternately disposed with each other and define at least one opening, and the colored light passes through the opening and then enters the optic modulator in the planar image mode.

12. The projector apparatus as claimed in claim 10, wherein the color filters of the color wheel module further comprise a transparent filter, and the colored light passes through the transparent filter and then enters the optic modulator in the planar image mode.

13. The projector apparatus as claimed in claim 10, wherein the beam splitter element is a color wheel, a color splitting prism or a fluorescent wheel.

14. The projector apparatus as claimed in claim 10, wherein the optic modulator is a digital micromirror device (DMD) or a liquid-crystal display (LCD) device.

15. The projector apparatus as claimed in claim 10, wherein the light source is a laser diode (LD) or a light emitting diode (LED).

\* \* \* \* \*